United States Patent
O'Neal

(10) Patent No.: US 6,360,571 B1
(45) Date of Patent: Mar. 26, 2002

(54) WHEEL LOCK

(76) Inventor: Robert O'Neal, 3595 Elizabeth Rd., Lake Worth, FL (US) 33461

(*) Notice: Subject to any disclaimer, the term of this patent is extended or adjusted under 35 U.S.C. 154(b) by 0 days.

(21) Appl. No.: 09/590,975

(22) Filed: Jun. 9, 2000

(51) Int. Cl.$^7$ ................................................ B60R 25/00
(52) U.S. Cl. ........................... 70/226; 70/38 A; 70/53; 70/259
(58) Field of Search ........................... 70/14, 53, 38 A, 70/209, 225, 226, 237, 238, 258–260, 233

(56) References Cited

U.S. PATENT DOCUMENTS

| | | | | |
|---|---|---|---|---|
| 2,924,960 A | * | 2/1960 | Palazzo | 70/180 |
| 3,391,555 A | * | 7/1968 | Mamo | 70/258 |
| 3,845,643 A | | 11/1974 | Barrett | 70/18 |
| 3,855,824 A | * | 12/1974 | Falk | 70/38 A |
| 4,064,716 A | * | 12/1977 | Shwayder et al. | 70/38 A |
| 4,256,322 A | * | 3/1981 | Otsuka et al. | 70/233 X |
| 4,294,088 A | * | 10/1981 | Barr | 70/259 X |
| 4,584,855 A | * | 4/1986 | Burlingame | 70/38 A |
| 4,768,359 A | * | 9/1988 | Wade | 70/226 X |
| 4,918,951 A | * | 4/1990 | Kavizky | 70/53 |
| 4,920,772 A | * | 5/1990 | Denison | 70/53 |
| 5,119,651 A | * | 6/1992 | Yang | 70/53 X |
| 5,134,868 A | * | 8/1992 | Bethards | 70/226 X |
| 5,199,282 A | * | 4/1993 | Wang | 70/38 A |
| 5,253,496 A | * | 10/1993 | Wang | 70/53 X |
| 5,315,848 A | * | 5/1994 | Beyer | 70/226 X |
| 5,331,830 A | * | 7/1994 | Su | 70/38 A |
| 5,333,477 A | | 8/1994 | Davis | 70/226 |
| 5,394,712 A | | 3/1995 | Chou | 70/38 A |
| 5,400,624 A | * | 3/1995 | Shieh | 70/38 A |
| 5,406,812 A | * | 4/1995 | Jaw | 70/38 A |
| 5,410,897 A | * | 5/1995 | Edmonson | 70/226 |
| 5,417,092 A | * | 5/1995 | Iu | 70/38 A |
| 5,437,171 A | | 8/1995 | Owen | 70/14 |
| 5,438,854 A | * | 8/1995 | Seraj | 70/53 X |
| 5,463,885 A | | 11/1995 | Warren, Sr. | 70/18 |
| 5,488,845 A | * | 2/1996 | Hsieh | 70/38 A |
| 5,689,981 A | * | 11/1997 | DeLuca et al. | 70/226 |
| 5,694,797 A | * | 12/1997 | Kuo | 70/53 |
| 5,720,191 A | * | 2/1998 | Tsung-Chuan et al. | 70/38 A |
| 5,787,742 A | | 8/1998 | Lewis et al. | 70/209 |
| 5,823,021 A | * | 10/1998 | Chang | 70/38 A |
| 5,832,753 A | * | 11/1998 | Nielsen | 70/38 A |
| 5,896,762 A | * | 4/1999 | Iidaka et al. | 70/53 X |

* cited by examiner

Primary Examiner—Suzanne Dino Barrett
(74) Attorney, Agent, or Firm—Akerman Senterfitt

(57) ABSTRACT

A lock assembly includes an elongated shackle having an engagement portion. A lock housing has an open interior and at least one opening for receiving a portion of a lock. The lock housing has at least one opening for receiving the engagement portion of the shackle. A lock member is dimensioned to fit within the open interior of the lock housing and to engage the engagement portion of the shackle. A lock body is adapted for engagement to an end of the lock member and is adapted to prevent the removal of the lock member from the engagement portion of the shackle. The lock and lock member are protected by the lock housing to substantially prevent unauthorized tampering.

14 Claims, 6 Drawing Sheets

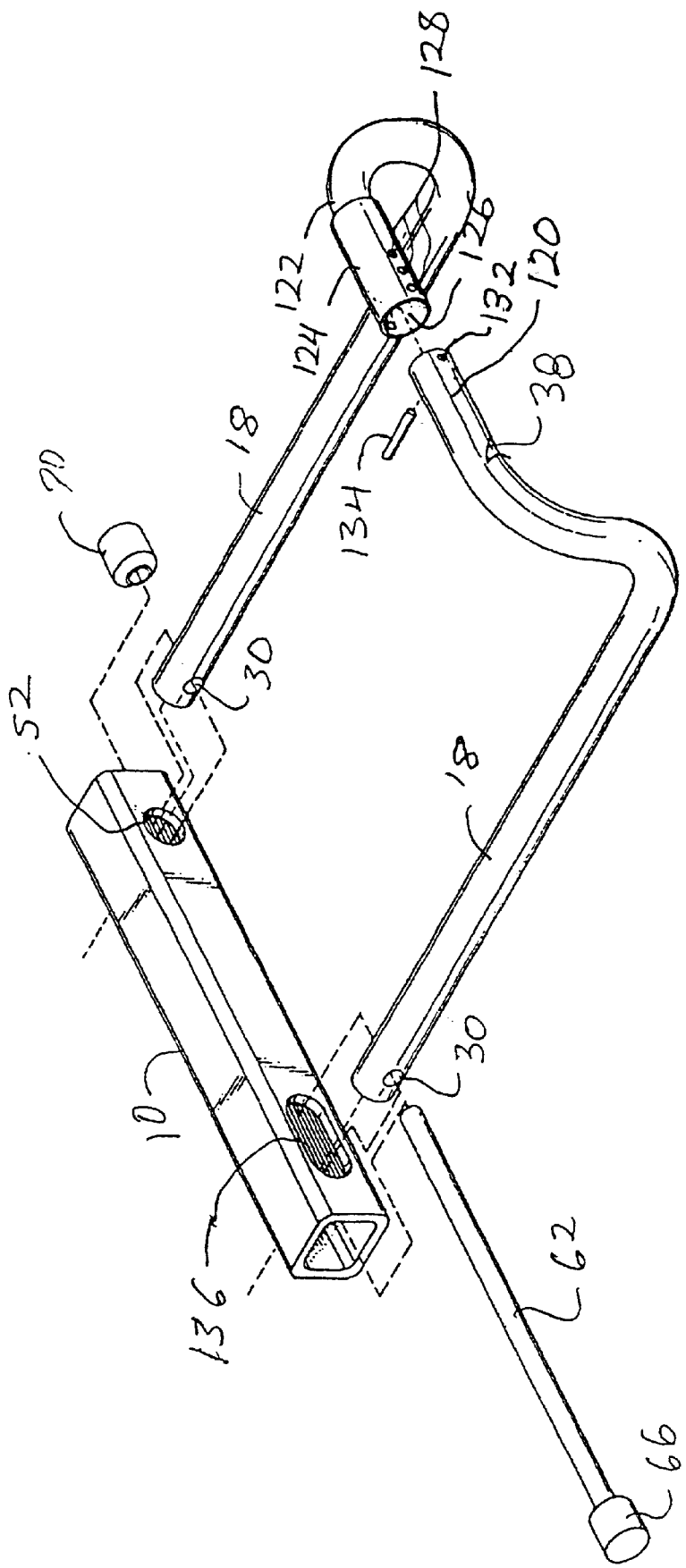

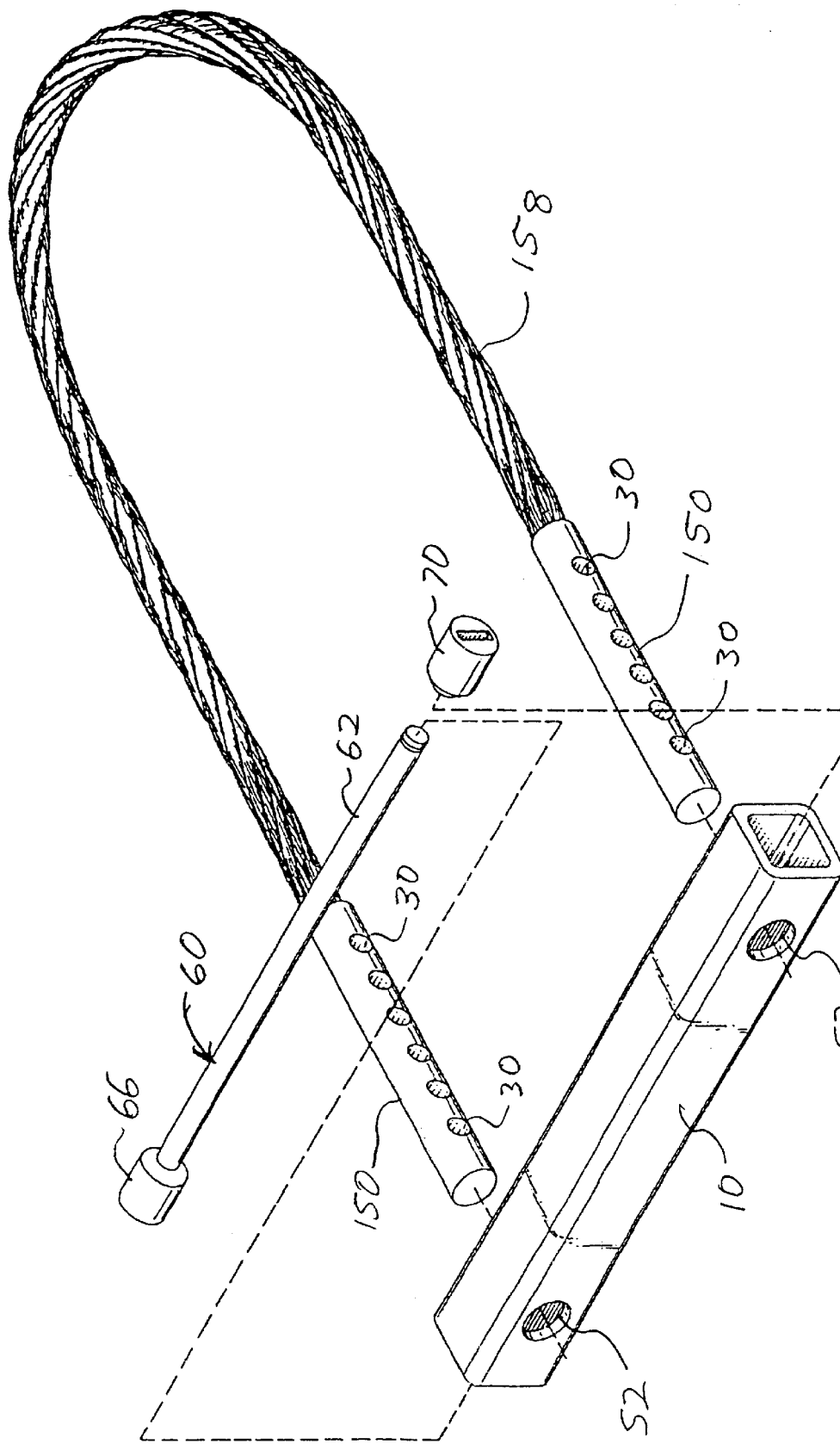

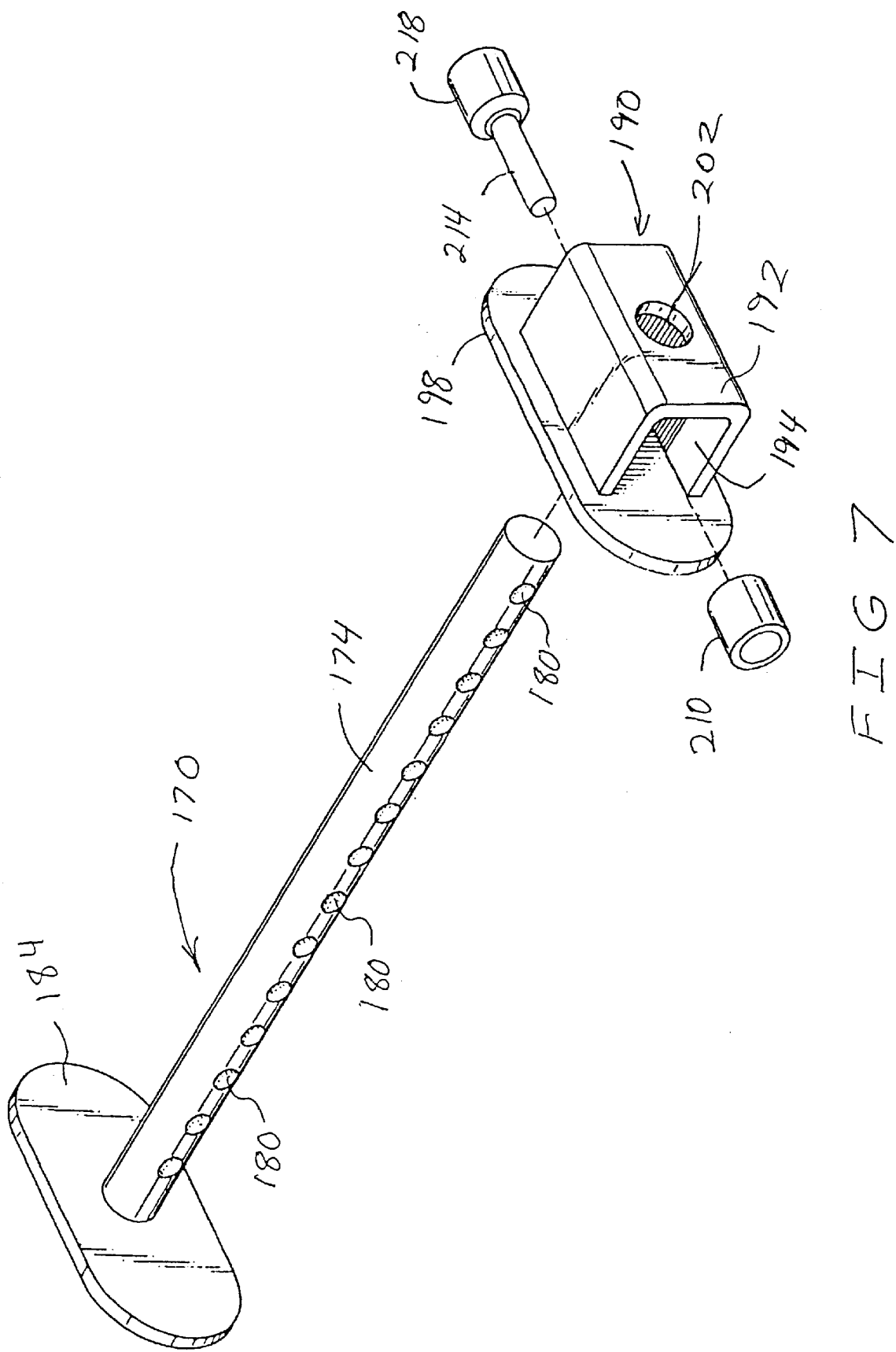

WHEEL LOCK

STATEMENT OF FEDERALLY SPONSORED RESEARCH OR DEVELOPMENT (Not Applicable)

CROSS-REFERENCE TO RELATED APPLICATIONS (Not Applicable)

BACKGROUND OF THE INVENTION

1. Field of the Invention

This invention relates to locks, and more particularly to locks useful for securing wheeled vehicles such as automobiles, trucks, trailers, motorcycles and bicycles.

2. Description of the Related Art

It is known that an effective and efficient manner of locking vehicles is to secure the wheels of the vehicle against rotation. Various locks for engaging automobile and trailer wheels, as well as motorcycle and bicycle wheels are known. These devices include chains and clasps of many descriptions. In many of these locks a shackle is secured to a lock body, where the shackle can be removed or separated from the lock body only by operation of an appropriate lock. The lock may be a combination lock, a key lock, or any lock of suitable construction. Such locks are susceptible to manipulation or breakage of the shackle or lock in order to separate the shackle from the lock body. It would therefore be desirable to provide a lock construction which has improved resistance to tampering with the lock.

SUMMARY OF THE INVENTION

A lock assembly includes an elongated shackle having an engagement portion for engaging a portion of a lock. A lock housing has an open interior and at least one opening for receiving a portion of a lock body. The lock housing has at least one opening for receiving the engagement portion of the shackle. The lock includes a lock member such as an elongated rod which is dimensioned to fit within the open interior of the lock housing and is adapted to engage the engagement portion of the shackle, so as to prevent removal of the engagement portion of the shackle from the lock housing. The lock body is adapted for engagement to the lock member and is dimensioned to fit, at least in part, within the open interior of the lock housing. Engagement of the lock body to the lock member prevents the removal of the lock member from the engagement portion of the shackle. The lock body is secured to the lock member within the housing, which substantially prevents tampering to disengage the shackle from the lock.

The shackle can be of any suitable construction. In one embodiment, the shackle is substantially U-shaped with two shackle leg portions and a connecting portion. Each shackle leg has at least one opening in the engagement portion for receiving the lock member. The shackle legs are preferably substantially parallel and coplanar. The connecting portion can be offset from the plane of the legs. The shackle can be made of a rigid material. In another embodiment, the shackle is made of a flexible material, such as wire cable. In yet another embodiment, the shackle is a single elongated shaft with an end plate. In another embodiment, the width of the shackle is adjustable.

The housing can have aligned first and second openings for receiving the engagement portion of the shackle. The engagement portion of the shackle can have a plurality of openings, or a slotted opening. In this manner, the shackle can be moved through the openings in the housing and the lock member can be placed through any of the plurality of openings, or in the slotted opening of the shackle, such that the position of the shackle relative to the lock housing can be adjusted.

BRIEF DESCRIPTION OF THE DRAWINGS

There are shown in the drawings embodiments which are presently preferred, it being understood that the invention is not limited to the precise arrangements and instrumentalities shown, wherein:

FIG. 5 is an exploded perspective of an alternative embodiment.

FIG. 6 is an exploded perspective of yet another alternative embodiment.

FIG. 7 is an exploded perspective of still another alternative embodiment.

DETAILED DESCRIPTION OF THE PREFERRED EMBODIMENTS

Figure 1:
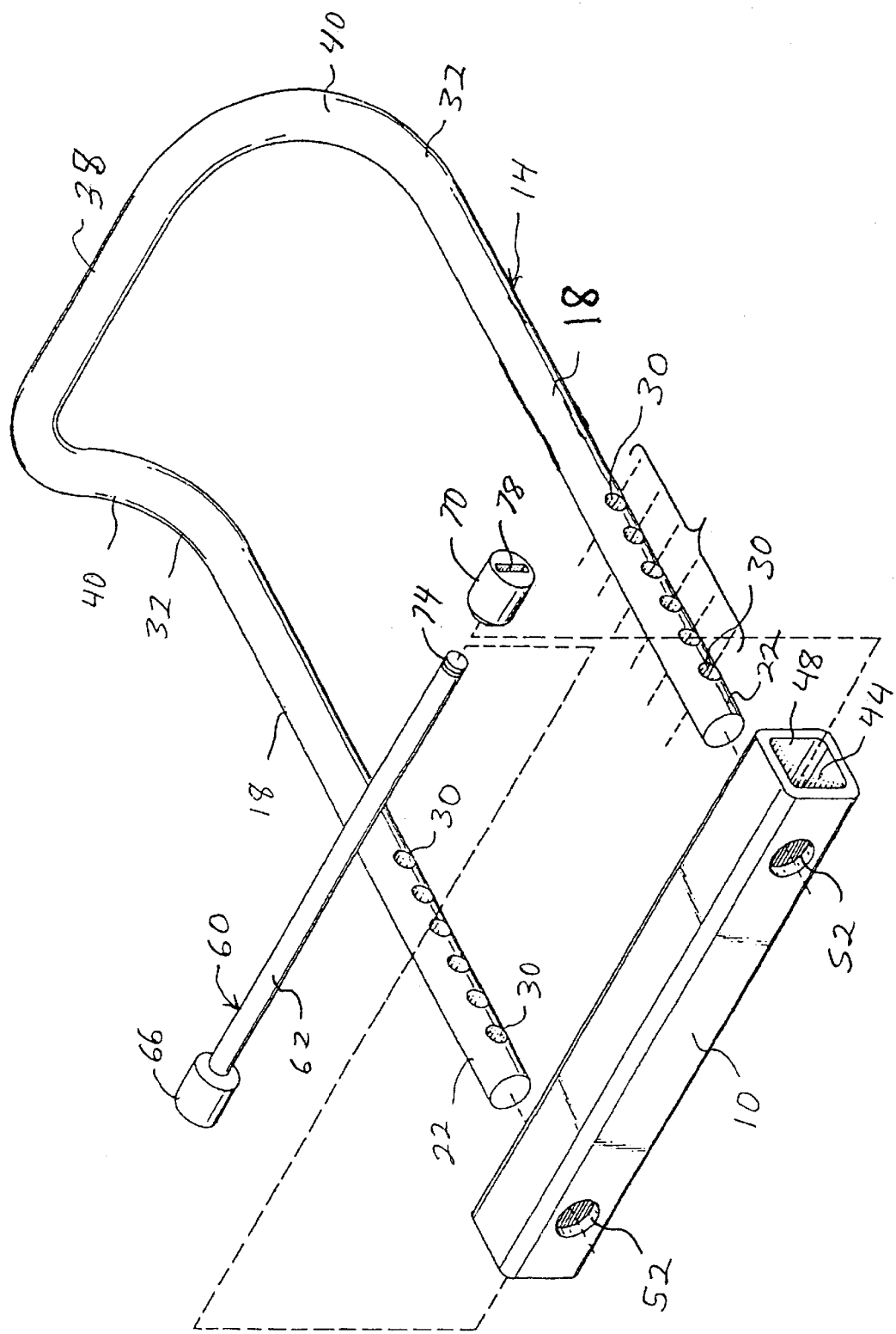
FIG. 1 an exploded perspective of a first embodiment of the invention.

A lock according to the invention as shown in FIG. 1 includes a lock housing 10 and a shackle shown generally at 14. The shackle in this embodiment includes elongated legs 18, which are preferably cylindrical. Engagement portions 22 of the legs 18 are provided with suitable engagement structure such as at least one opening 30. In a preferred embodiment, a plurality of openings 30 are provided along the length of each shackle leg 18. Second ends 32 of the legs 18 are connected by an abutment portion 38 which connects the second ends 32 to one another The abutment portion 38 can be offset from the plane containing the legs 18 by extension portions 40 which are substantially at right angles to the legs 18.

The lock housing 10 has an open interior 44. The housing 10 has at least one opening 48 leading to the open interior 44. The lock housing further can have openings 52 adapted to receive each of the engagement portions 22 of the legs 18. Two aligned openings 52 are preferably provided on opposing sides of the housing 10, such that the legs 18 can move through the openings 52 and the lock housing 10 to provide for adjustments in the spacing between the lock housing 10 and the abutment portion 38.

A lock member 60 can be made of any suitable construction but preferably includes an elongated portion 62. The elongated portion 62 is dimensioned so as to fit within the openings 30, and has an enlarged portion 66 at one end which is adapted to prevent passage of that end through the openings 30. At an opposite end, suitable structure 74 on the elongated portion 62 is provided to engage a lock 70 so as to secure the lock to the elongated portion 62. The lock 70 and manner of engagement to the elongated portion 62 can be of any suitable construction. In the embodiment shown, a key slot 78 provides for the insertion of a key in order to remove the lock 70, however, other lock constructions known in the art would also be suitable.

In operation, the shackle 14 is placed through and/or around an item to be locked. The engagement portions 22 of the legs 18 are placed into the openings 52 of the lock housing 10 and are moved through the lock housing 10 until the appropriate spacing between the abutment portion 38 and the lock housing 10 has been attained.

The lock member 60 is then placed into the lock housing 10 through the opening 44 and is moved through an opening 30 in each of the legs 18 until the lock member 60 is within the lock housing 10. In a preferred embodiment, the lock housing 10 has an opening 44 for receiving the lock member 60 and another opening 44 for receiving the lock 70. The lock 70 is then secured to the structure 74 on the elongated portion 62 so as to secure the lock member 60 in place within the housing 10 and thereby also secures the shackle 14 to the lock member 60 and the lock housing 10. The lock member 60 and lock 70 remain protected within the lock housing 10 in order to prevent tampering and manipulation of the lock 70.

Figure 2:
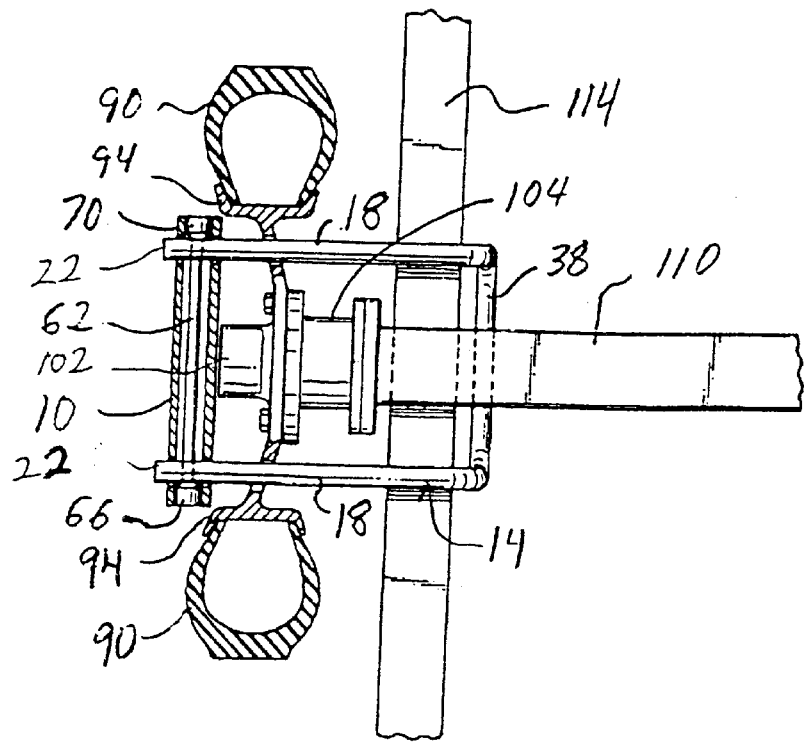
FIG. 2 is a plan view, partially in cross-section, of the invention as installed on a wheel assembly.
Figure 3:
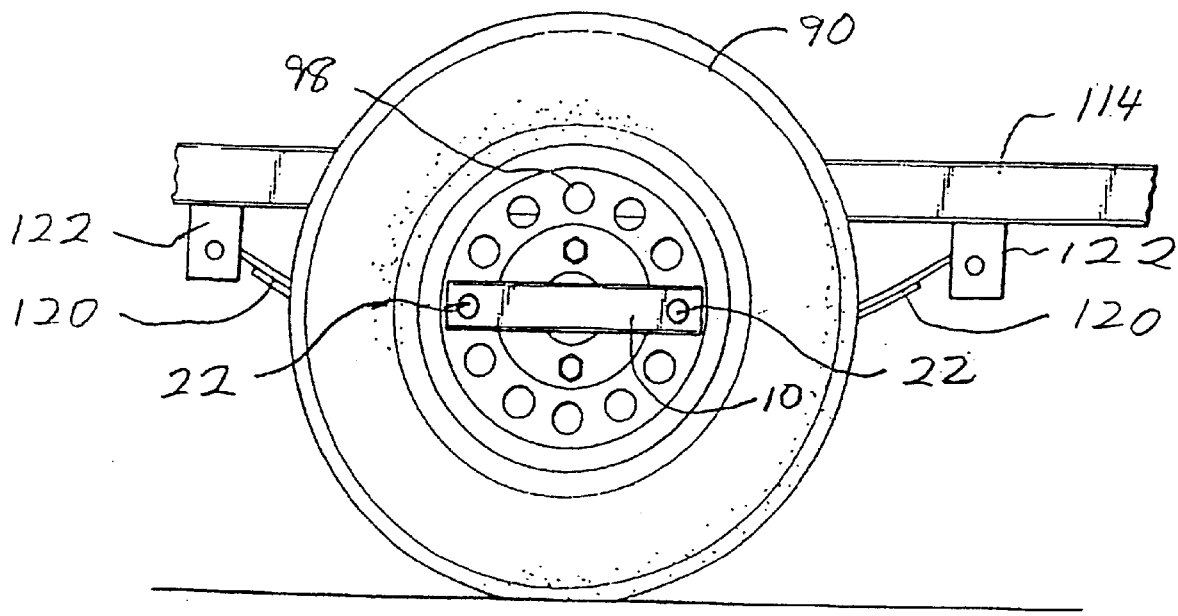
FIG. 3 is a front elevation of the lock as installed on a wheel assembly, partially in cross section.
Figure 4:
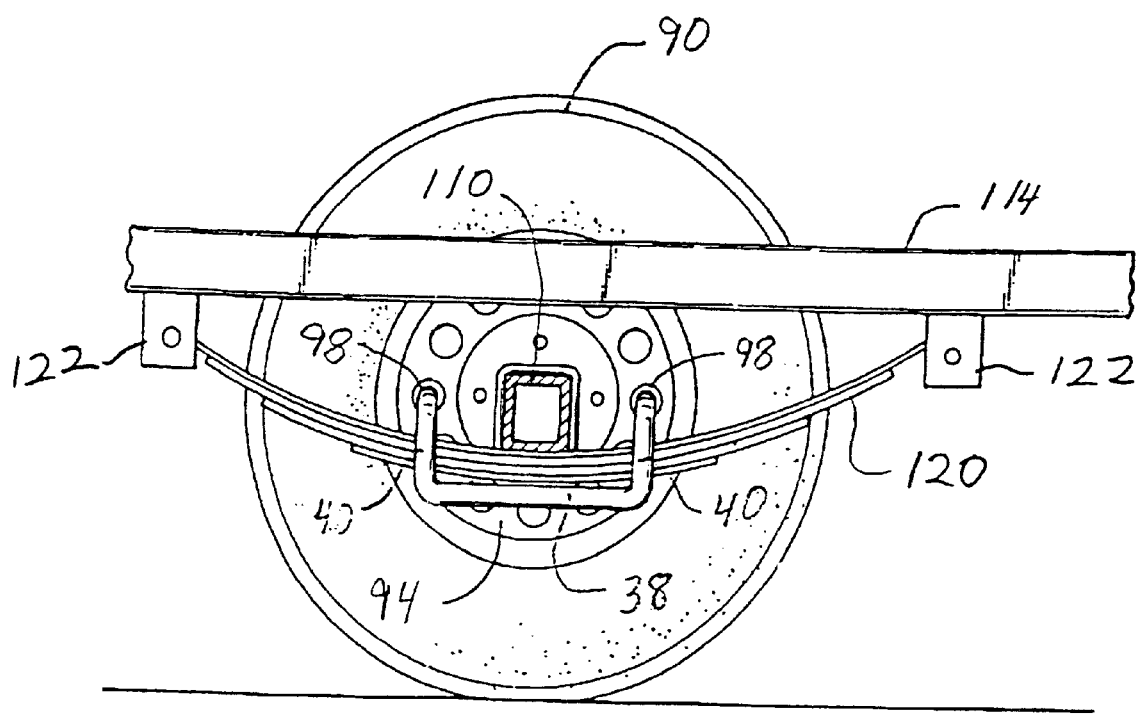
FIG. 4 is a rear elevation of the lock as installed on a wheel assembly.

The use of the lock is illustrated in FIGS. 2–4. A lock according to the invention is shown as installed in a wheel assembly. The tire 90 is mounted on a wheel 94 having a plurality of openings 98. A hub 102 is connected to an axle 104 and an axle support 110. A frame 114 mounts a spring 120 through suitable structure such as attachment plates 122. In the installation that is shown, the shackle 14 is secured to the wheel 94 in such manner that rotation of the tire 90 is impossible. The legs 18 of the shackle 14 are positioned through the openings 98 of the wheel 94. The abutment portion 38 is adjacent to the axle support 110. The legs 18 are positioned into the openings 52 in the lock housing 10. The lock member 60 is then placed through the opening 48 into the open interior 44 and through the openings 30 in the legs 18, until the enlarged portion 66 is within the housing 10. The lock 70 is then secured to the cooperating structure 74 on the lock member 60 and locked in place. The lock 70 is seen in FIG. 2 to be securely within the lock housing 10 so as to substantially preclude tampering with the lock 70. The legs 18 are movable through the openings 52 of the lock housing 10 to adjust the relative distance between the abutment portion 38 and the lock housing 10, such that the lock of the invention can accommodate different wheel assembly sizes and constructions. In smaller wheel assemblies the legs 18 will be moved through openings 52 in the lock housing 10, such that the abutment portion 38 is closer to the lock housing 10. The extension portions 40 allow the abutment portion 38 to substantially wrap around the axle support 110.

In an embodiment shown in FIG. 5, the spacing between the legs 18 is adjustable. The abutment portion 38 has a first end 120 and second end 122. A collar shape, 124 has a series of openings 128 and an open interior 126. The first end 120 has an opening 132. The end 120 is adapted to be positionable in the open interior 126. Suitable structure such as a pin 134 can be positioned through the openings 128 and the opening 132 in the end 120 in order to secure the assembly in place at the desired spacing between the legs 18. Other adjustable connection structure is possible. One or both of the openings in the lock housing 10 can be slotted. The slotted opening 136 allows for lateral movement of the leg 18 relative to the lock housing 10. This embodiment will, for example, allow for use of the lock with wheels having a different spacing between the openings 98.

In some instances a rigid shackle is not desirable, if some flexibility is needed in order to properly attach the shackle to a wheel assembly or other structure. An alternative embodiment of the invention which provides such flexibility is shown in FIG. 6. In this embodiment, the rigid shackle is replaced by a flexible cable 158, which is preferably a metal braid. Other cables made from other materials, or chain cables, are also possible. Shackle ends 150 are secured to each end of the cable 158. The shackle ends 150 fit within the openings 52 in the lock housing 10 in order to secure the lock 70 from tampering. The shackle ends 150 can have openings 30 for receiving the elongated portion 62 of the lock member 60, as previously described.

The invention has utility with other lock constructions having a variety of shackle designs, shapes and sizes. In an alternative embodiment shown in FIG. 7, a lock construction is shown in which the shackle 170 has a single leg 174. The leg 174 is, in this embodiment, elongated and substantially cylindrical, although other shapes and designs are possible. A plurality of openings 180 are provided along the length of the leg 174. A distal end of the shackle leg 174 has an abutment portion 184. The abutment portion 184 is provided to engage the wheel or other structure to which the lock is to be secured. The abutment portion can be a plate that is secured to the shackle leg 174 substantially at right angles. Any size or design of the abutment portion 184 is possible, so long as the abutment portion prevents the removal of the shackle leg 174 from the wheel or other structure to which the lock is attached, unless the lock is first unlocked and removed.

The lock housing 190 can include a substantially elongated body 192 with an open interior 194. An abutment portion such as an enlarged side plate 198 can be provided at one side of the lock body 192 in order to prevent the passage of the lock housing 190 through an aperture in the structure to which the lock is secured. Openings 202 in the lock housing 190 are adapted to receive the shackle leg 174. A lock 210 of suitable construction is provided to engage an elongated lock member 214. The lock 210 is positioned in the open interior 194 and the lock member 214 is placed through one of the openings 180 in the shackle body 174. The lock member 214 has an enlarged end portion 218 such that, when the lock 210 is secured to the lock member 214, the lock 210 and lock member 214 cannot be removed through the opening 180 in the shackle body 174. The lock 210, lock member 214 and end portion 218 are secured within the housing 190 so as to substantially prevent tampering and unauthorized removal.

Locks according to the invention can be made from any suitable material. The locks should be very strong, durable, and corrosion resistant. Known materials for the construction of locks, such as metals, alloys and other materials, are suitable.

The invention is capable of taking other specific forms without departing from the spirit or essential attributes thereof, and accordingly, reference should be had to the following claims, rather to the foregoing specification, as indicating the scope of the invention.

I claim:

1. A lock assembly, comprising:
   a shackle having an engagement portion with a plurality of apertures therethrough;
   a lock housing comprising a first end having a first end opening, a second end having a second end opening and an open interior between said ends for receiving a lock body therein, and at least one opening for receiving said engagement portion of said shackle;
   said lock body comprising:
   an elongate lock member dimensioned to pass through at least one of said apertures in said engagement portion;

a lock adapted for engagement to said lock member so as to prevent the removal of said lock member from said at least one aperture in said engagement portion of said shackle, said lock body being dimensioned to substantially fit within said lock housing, said lock having access structure accessible from either of said first and second ends of said lock housing;

wherein said lock member may be passed through at least one alternative aperture of said plurality of apertures in said shackle for adjusting the position of said shackle relative to said lock housing.

2. The lock assembly of claim 1, wherein said shackle is substantially U-shaped with two shackle legs and a connecting abutment portion, each shackle leg having an engagement portion with an aperture for receiving said lock member, said lock housing having corresponding openings for receiving said engagement portions.

3. The lock assembly of claim 2, wherein said shackle legs are substantially parallel and coplanar, and said connecting portion is offset from the plane of said legs.

4. The lock assembly of claim 2, wherein said connecting portion comprises adjustment structure for adjusting the distance between the shackle legs.

5. The lock assembly of claim 1, wherein said housing has aligned first and second openings for receiving said engagement portion of said shackle, said engagement portion of said shackle having a plurality of apertures, whereby said shackle can pass through said aligned openings in said housing, and said lock member can be placed through one of said apertures in said engagement portion of said shackle to adjust the position of said shackle relative to said lock housing.

6. The lock assembly of claim 1, further comprising an abutment portion at an end of said shackle substantially opposite to said engagement portion.

7. The lock assembly of claim 6, wherein said abutment portion comprises a plate.

8. The lock assembly of claim 1, wherein said shackle comprises a flexible material.

9. The lock assembly of claim 1, wherein said lock housing comprises an abutment portion.

10. The lock assembly of claim 1, wherein said lock housing comprises at least one slotted opening.

11. The lock assembly of claim 1, wherein said lock housing comprises an opening for receiving the lock body and an opening for receiving the lock member.

12. A lock assembly, comprising:

a substantially U-shaped shackle with two shackle legs and a connecting abutment portion, each shackle leg having an engagement portion with an aperture therethrough;

a lock housing comprising a first end having a first end opening, a second end having a second end opening and an open interior between said ends for receiving a lock body therein, and at least one opening for receiving said engagement portion of each said shackle;

said lock body comprising:

an elongate lock member dimensioned to pass through each of said apertures in said engagement portions; and a lock adapted for engagement to said lock member so as to prevent the removal of said lock member from said engagement portions of said shackle, said lock body being dimensioned to substantially fit within said lock housing, said lock having access structure accessible from one of said first and second ends of said lock housing;

wherein said connecting abutment portion comprises adjustment structure for adjusting the distance between the shackle legs, whereby said lock assembly may be locked in at least two configurations with the shackle legs having different distances therebetween.

13. The lock assembly of claim 12, wherein said shackle leg portions are substantially parallel and coplanar, and said connecting portion is offset from the plane of said leg portions.

14. The lock assembly of claim 12, wherein said lock housing comprises at least one slotted opening.

* * * * *